United States Patent [19]

Nishimura

[11] Patent Number: 5,308,961
[45] Date of Patent: May 3, 1994

[54] OPTICAL-CARD READER
[75] Inventor: Junichi Nishimura, Mukou, Japan
[73] Assignee: Omron Corporation, Kyoto, Japan
[21] Appl. No.: 851,694
[22] Filed: Mar. 13, 1992
[30] Foreign Application Priority Data
  Mar. 15, 1991 [JP] Japan ................................ 3-74194
[51] Int. Cl.⁵ .............................................. G11B 20/10
[52] U.S. Cl. .................................. 235/454; 369/97; 369/124
[58] Field of Search .................... 235/454; 369/97, 124
[56] References Cited
U.S. PATENT DOCUMENTS
  4,864,113 9/1989 Ogura .................................. 235/477
  4,958,339 9/1990 Koyama et al. ..................... 235/454

FOREIGN PATENT DOCUMENTS
  0301108 2/1989 European Pat. Off. .
  2205423 12/1988 United Kingdom .

Primary Examiner—Andrew M. Dolinar
Attorney, Agent, or Firm—Dickstein, Shapiro & Morin

[57] ABSTRACT

Data read off an optical card are stored in a read buffer. If there are data in the read buffer when a read command is received, decoding is begun. If read commands are being issued for consecutive tracks, the reading of the data on the next track will begin as soon the reading of the preceding track is completed. This allows reading and decoding to be performed in parallel 7 Claims, 8 Drawing Sheets

OPTICAL-CARD READER

BACKGROUND OF THE INVENTION

1. Field of the invention

This invention relates to an optical-card reader and to an apparatus and method for reproducing data from selected tracks of an optical card. The term "optical card," is used herein to mean a card on which data can be recorded and reproduced optically, or one on which data can be recorded and reproduced photomagnetically.

2. Description of the Prior Art

FIG. 6 shows a known optical card 40 and includes an enlarged portion showing data tracks, on which data are recorded and reproduced optically by a card reader/writer. Optical card 40 has a data recording area 41, within which a number of tracks 43 are separated from each other by track guides 42. Data are recorded on tracks 43 in the form of pits 44. In general, optical cards typically have a recording capacity of around two megabytes.

Since the number of data which can be recorded on a single track of the card is limited, it is not unusual for a large data set to be recorded on several tracks or even on several tens of tracks. Thus data must be recorded and reproduced continuously over a number of tracks.

The recording of data on an optical card entails a number of coding operations, including error detection prior to recording, error correction and data interleave. To read the data from the card, then, it must first be decoded, and only one data track can be decoded at a time.

To continuously regenerate a large data set which ranges over a number of tracks, decoding from a track must begin while the data are still being read from the track. The data in the subsequent track cannot be read until the decoding of the previous track has been completed.

FIGS. 7 and 8 show the timing of the card-feed operations in relation to the read and decode operations in an existing device for recording and reproducing data on optical cards.

FIG. 7 shows the timing which exists after the card is conveyed back to its starting point. Data will be read only while the card is being fed forward (forward conveyance). The optical card is conveyed forwardly by the feed device in the direction in which its tracks are oriented (Direction X in FIG. 6). The optical head which reads the data off the card is conveyed in the direction Orthogonal to that of the card's movement (Direction Y in FIG. 6), to access the specified track.

As shown in FIG. 7, the optical card is conveyed in a forward direction when a read command is output by the CPU. As the card is being conveyed forward, the read data are read from the specified track by the optical head. As soon as all the data have been read from the first track, the decoding operation is begun. While decoding is in process, the optical card is then conveyed in the reverse direction. The amount of time it takes to reverse is determined by how fast the card-feed device conveys the marginal portion of card 40 which surrounds recording area 41 and how long it takes for the conveyor motor of the card-feed device to come to a halt and start up in reverse.

When decoding has been completed for the data on a given track, the newly decoded data are transmitted to the CPU as a response. If data are being continuously reproduced over a number of tracks, a read command for the next track will be transmitted by the CPU as soon it receives the response. However, at this moment the card feed device is in the midst of conveying the card in the reverse direction. Therefore, before the reading of the data on the next track can begin, there is an unavoidable wait (waiting time) while the reverse feed of the card is completed and the direction of feed is changed.

FIG. 8 shows the timing relationship between the card-feed and the various operations when the card is fed in two directions and the data are read off the card during both forward movement (forward conveyance) and reverse movement (reverse conveyance).

As shown in FIG. 8, the optical card is conveyed in a forward direction when a read command is output by the CPU. As the card is conveyed forward, the data are read from a first specified track by the optical head. As soon as all the data have been read from the first track, the decoding operation is begun. While decoding is in process, the card-feed operation will be reversed after the direction of card-feed has been reversed, and will remain stopped (stop time) until a read command for the next track is issued by the CPU.

When decoding has been completed for the data on a given track, the newly decoded data are transmitted to the CPU as a response. If data are being continuously reproduced over a number of tracks, a read command for the next track will be transmitted by the CPU as soon as the response is received. This command will cause the optical card to be conveyed in the reverse direction and its data to be read and decoded exactly as before.

As has been discussed above, the following problems occur in existing recording and reproducing devices for optical cards when data which extend over a number of tracks are to be continuously reproduced. When the data are read while the optical card is being fed forward (FIG. 7), a waiting time is required between the decoding of one track's data and the reading of the next track's data while the card-feed device starts up its forward operation.

When the data are read while the optical card is being fed both forward and in reverse (FIG. 8), the card-feed operation must be halted during the time that a single track's data are being decoded.

SUMMARY OF THE INVENTION

One object of the invention is to provide an optical-card reader which overcomes the problems of wasted time attendant known optical readers. It comprises reading means, memory means, decoder means, and controlling means. The controlling means operates to initiate a reading of a first specified track and the read track data is decoded as the controlling means initiates a reading of a second specified track, when a reading command requiring the reading of a plurality of data tracks is given.

The first specified track is accessed by an optical head and the data are read from that single track as the card is being conveyed. Once read, the data are stored in a read buffer.

If there are any data in the read buffer at the time a read command is received from the controlling means, these data are decoded and the data are now read from the second track specified by the read command. As soon as all the data have been read off the specified track, these data are decoded. If read commands are received successively for different tracks, the data will be read from the succeeding track as soon as the reading of data from the earlier track is completed.

In a device designed according to this invention, the reading and decoding of data are performed in parallel. When read commands are received for consecutive tracks, the data in the succeeding track will be read as soon as the reading of the data in the earlier track has been completed. Thus when the decoding of the data in the preceding track is completed, the data in the next track will already have been partially or completely read. The decoded data with respect to the read command can be transmitted without delay. There is no need to delay data reading in order to synchronize it with the operation of the card-feed device, nor is there any need to halt the card-feed device while decoding is in process. When read commands are issued intermittently, the reading of the data in the track indicated by the command will already b finished, and a response can be sent as soon as those data are decoded.

BRIEF DESCRIPTION OF THE DRAWING

Further objects, advantageous and feature of the invention are explained below in connection with a detailed description with the help of the attached drawings in which.

DESCRIPTION OF THE PREFERRED EMBODIMENT

Figure 1:
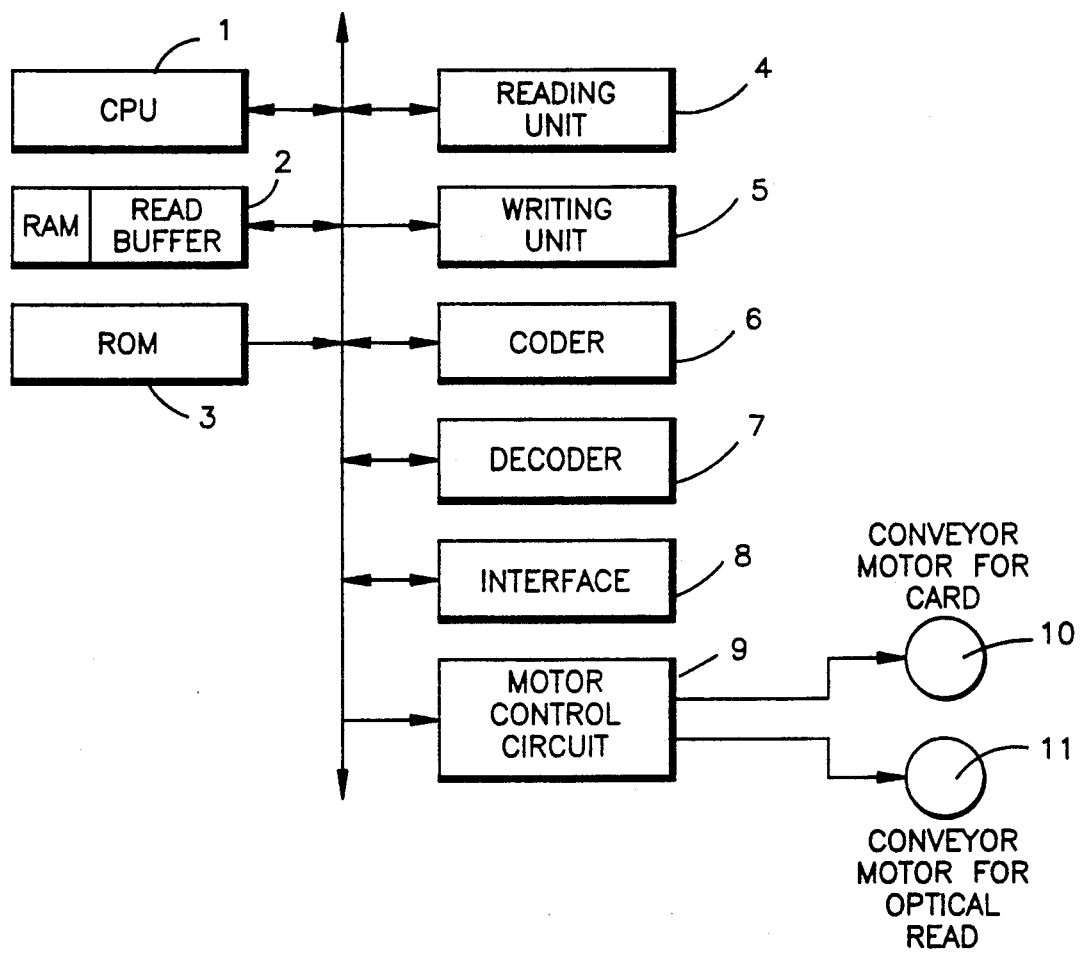
FIG. 1 is a block diagram of the electrical organization of an optical recording and reproducing device constructed in accordance with the present invention.

FIG. 1 is a block diagram of the electrical organization of an optical-card recording and reproducing system constructed in accordance with the invention. The system comprises CPU 1, which oversees all operations; RAM 2, which stores the various data that are read; ROM 3, in which the operating program, constants and other necessary information are stored prior to the use of the device; data reading unit 4, which reads data off the optical card one track at a time; data writing unit 5, which writes data onto the optical card; coder 6, which codes the data which are to be written on the optical card; decoder 7, which decodes the data read off the optical card; interface 8, which connects the device to external equipment; and motor control circuit 9, which controls conveyor motor 10 in the card-feed device and conveyor motor 11 in the device which conveys an optical head for recording and reproduction.

Data reading unit 4 includes both the read circuit, which shapes the waveform of the read signal from the optical head (not shown) and converts it from an analog to a digital signal, and the circuit which controls this read circuit. Data writing unit 5 includes the DA converter circuit for data to be written in; the drive circuit for the optical head; and the control circuit for that drive circuit. Data reading unit 4 and data writing unit 5 also control the operation of motor control circuit 9. The functions of the control circuits for reading unit 4 and writing unit 5 as well as those of coder 6 and decoder 7 may be constructed either by hardware or by software. If software were chosen, a CPU would be provided for units 4, 5, 6 and 7. This CPU could serve all four units, or some might be served by CPU 1.

RAM 2 contains the read buffer. The data read from one track by reading unit 4 are stored temporarily in this read buffer.

Figure 2:
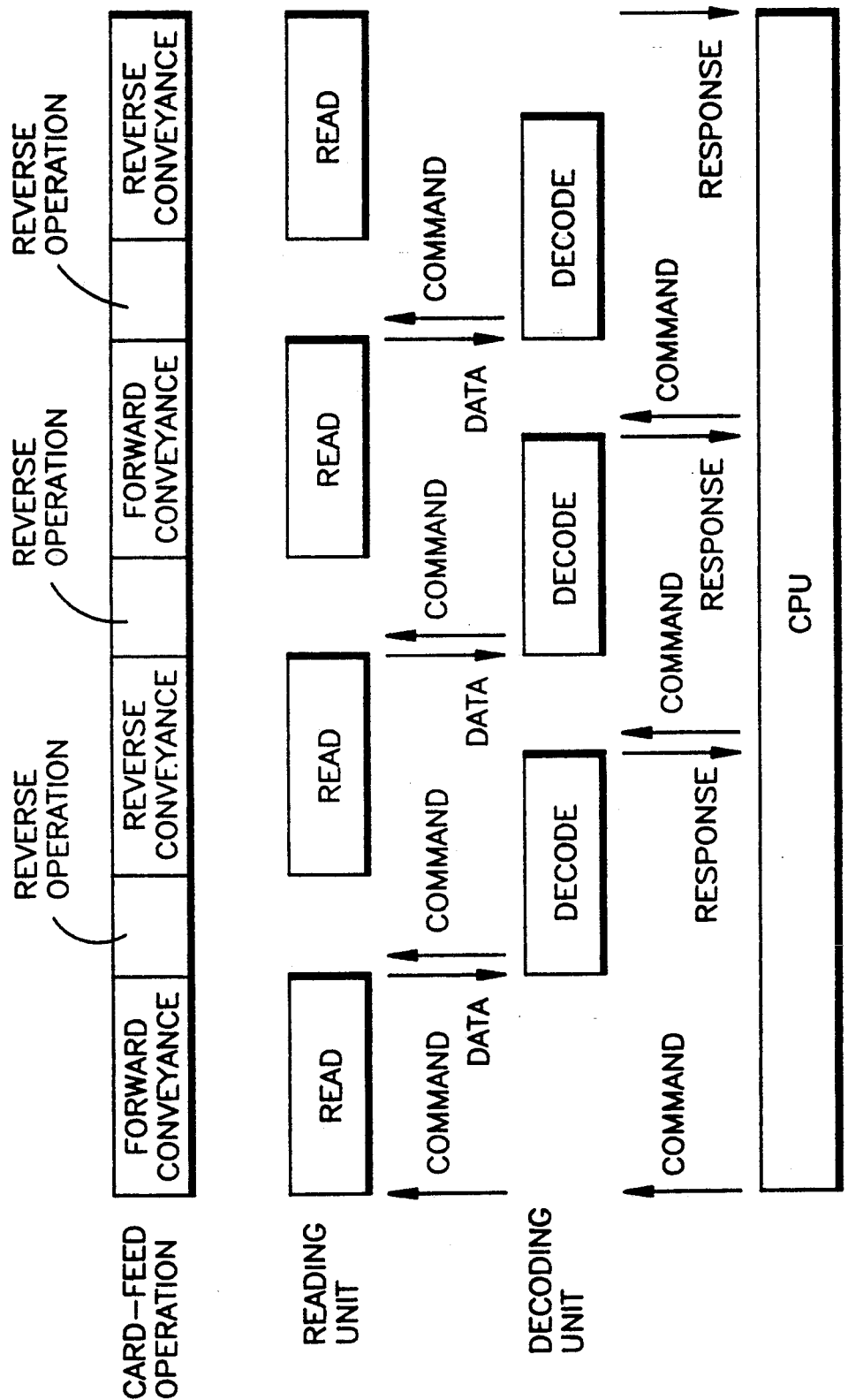
FIG. 2 shows the timing relationship between the movement of the optical card and various operations of the recording and reproducing device when the data are read off the card as it moves in both forward and reverse directions, and when a read command for the next track is issued by the CPU immediately after a response is received.

FIG. 2 shows the timing relationship between the movement of the optical card and the various operations of the FIG. 1 system when the data are read off the card as it moves in both forward and reverse directions, and when a read command for the next track is issued by the CPU immediately after a response is received. Such a command indicates that succeeding tracks should be read in order, and it designates the next track to be read after every track.

As shown in FIG. 2, when a read command for the succeeding track is issued by the CPU, it is routed through decoder 7 and sent to data reading unit 4. Under the control of this reading unit, the optical card is conveyed in a forward direction. As the card is being conveyed forward, reading unit 4 reads the data from the first track indicated. Once read, the data are stored in the read buffer.

When the data from the first track have been stored, a read command for the second track is sent to reading unit 4. At the same time, decoder 7 immediately begins decoding the data from the first track which are stored in the buffer. As these data are being decoded, reading unit 4 directs that the direction of card-feed be reversed, the card is conveyed in the opposite direction, and the optical head accesses the next track. As the card is being conveyed in reverse, reading unit 4 reads the data from the second track. The reading of data from the second track by unit 4 and the decoding of the data in the buffer by decoder 7 are performed in parallel. If the decoding of the data from the first track is completed first, the decoded data are transmitted from decoder 7 to the CPU as a response. Because the read command for the second track is issued by the CPU as soon as it receives the response, decoder 7 waits for the data from the second track to be accessed in the buffer. While it begins decoding these data, reading unit 4 is directed to read the data o the third track.

Figure 3:
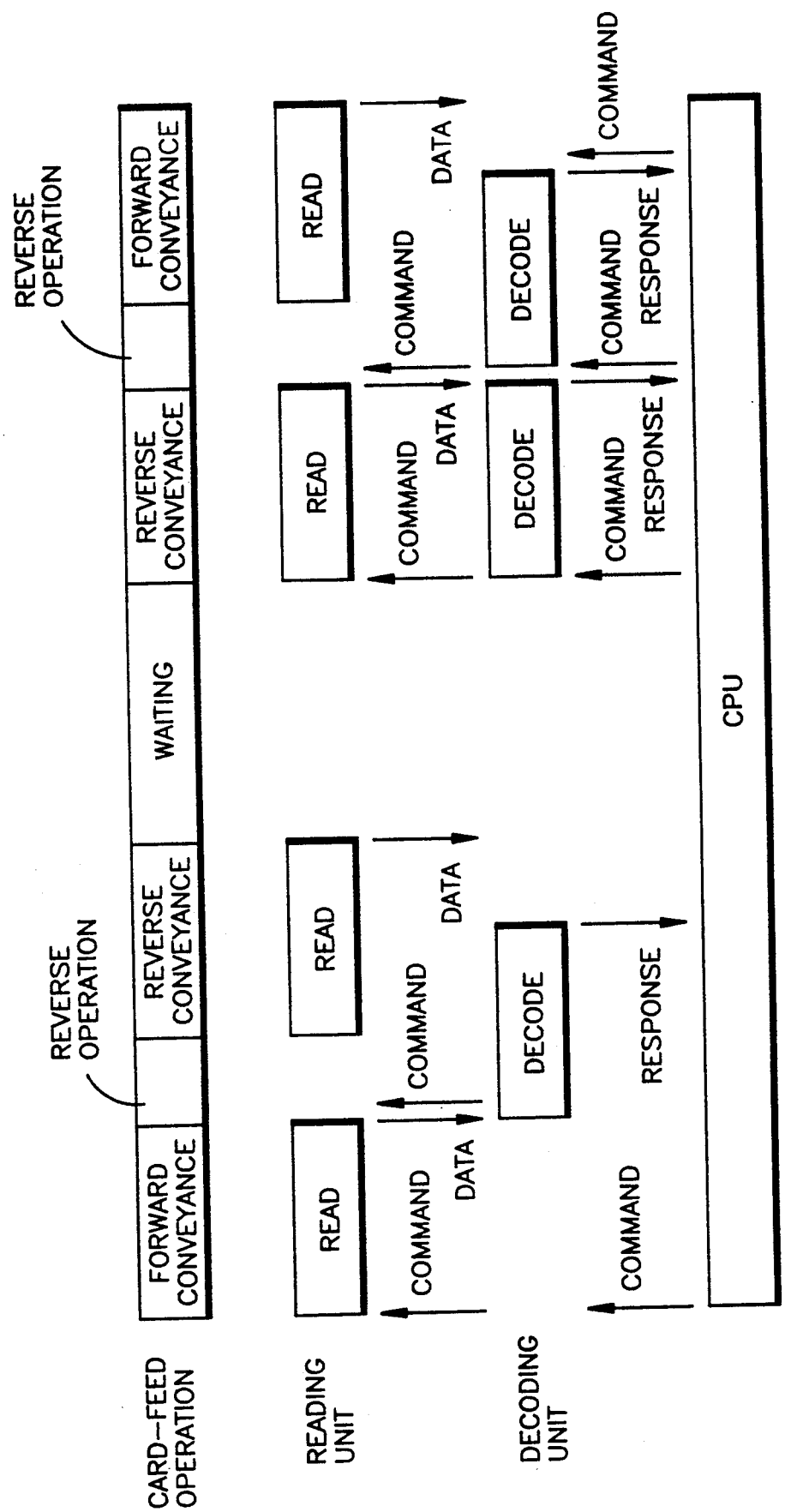
FIG. 3 shows the timing relationship between the movement of the optical card and various operations of the recording and reproducing device when the data are read from the card during both its forward and reverse movement, and a read command is issued by the CPU some time after a response is received.

FIG. 3 shows the timing relationship between the travel of the optical card and the various operations of FIG. 1 system when the data are read from the card during both its forward and reverse movement, and read commands for succeeding tracks are issued intermittently by the CPU in the intervals not required for the reading and decoding of a single track's data.

As shown in this diagram, a read command for the first of a succession of tracks is issued by the CPU to decoder 7. Upon receiving this command, decoder 7 sends a read command to reading unit 4, which begins to read the data. In other words, the first track which has been designated is accessed by the optical head, and the optical card is fed forward. In this way reading unit 4 reads the data from one track. The data read from the first track are stored in the read buffer, and decoder 7 decodes them. Since read commands are being issued for successive tracks, decoder 7 immediately sends a read command for the second track to reading unit 4. In response to this read command, the optical card is conveyed in reverse in the reading unit, and the data are read from the second track. If the next read command does not come from the CPU as soon as the decoded data are sent from decoder 7 to the CPU as a response, decoder 7 stands by. If the reading of the data on the second track is completed during this interval, these data are stored in the read buffer.

After some time has passed, the CPU will send the consecutive read command, which will be for the data on the third track. Decoder 7 will transmit a read command for the third track to reading unit 4, and will immediately begin decoding the data from the second track which are stored in the read buffer. When reading unit 4 receives the read command, it will read the data from the third track as the card is being conveyed in reverse. The decoding of the data from the second track and the reading of the data from the third track are performed in parallel. When all the data from the second track have been decoded, they are transmitted to the CPU (response). Thus the reading of the data off the second track is already completed when the read command for that track is output by the CPU. In response to that read command, the data from that track are decoded and immediately transmitted to the CPU.

Figure 4:
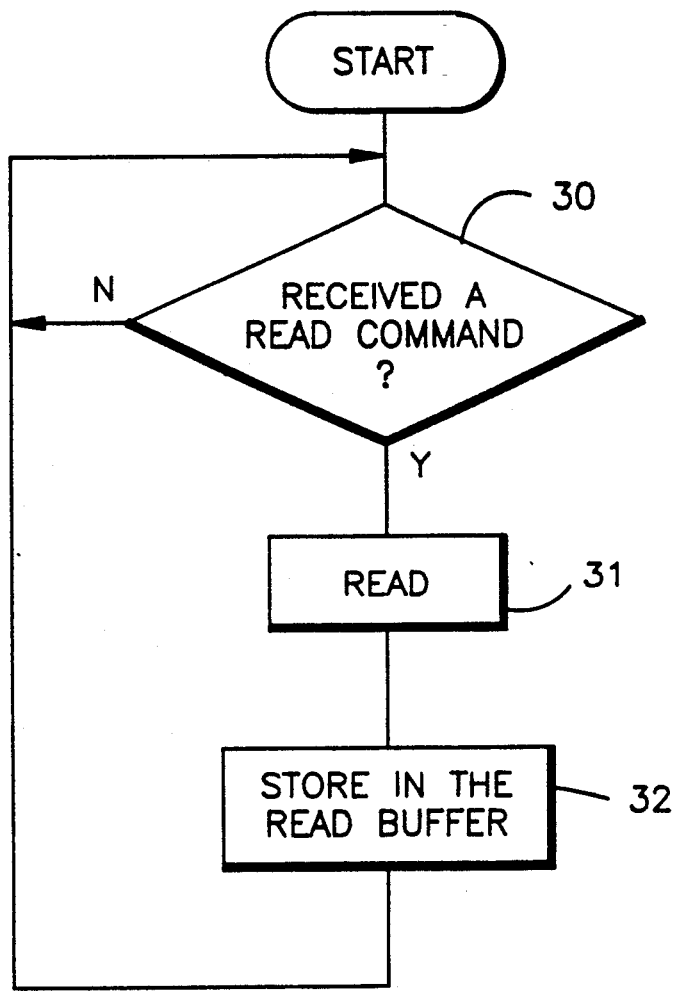
FIG. 4 is a flow chart showing the order of processing performed by the reading unit of FIG. 1.

FIG. 4 shows the order of processing performed by reading unit 4 when it executes the operations shown in FIGS. 2 and 3.

As shown in this diagram, decoder 7 begins operation of reading unit 4 by issuing a read command to reading unit 4 for the data in a given track. (The answer in Step 30 is "yes.") Reading unit 4 performs all the processing entailed in reading the data, including causing the optical head to access the specified track, causing the optical card to be fed forward or in reverse, and so on (Step 31). When all the data have been read off this track, they are stored in the read buffer in RAM 2 (Step 32).

Figure 5:
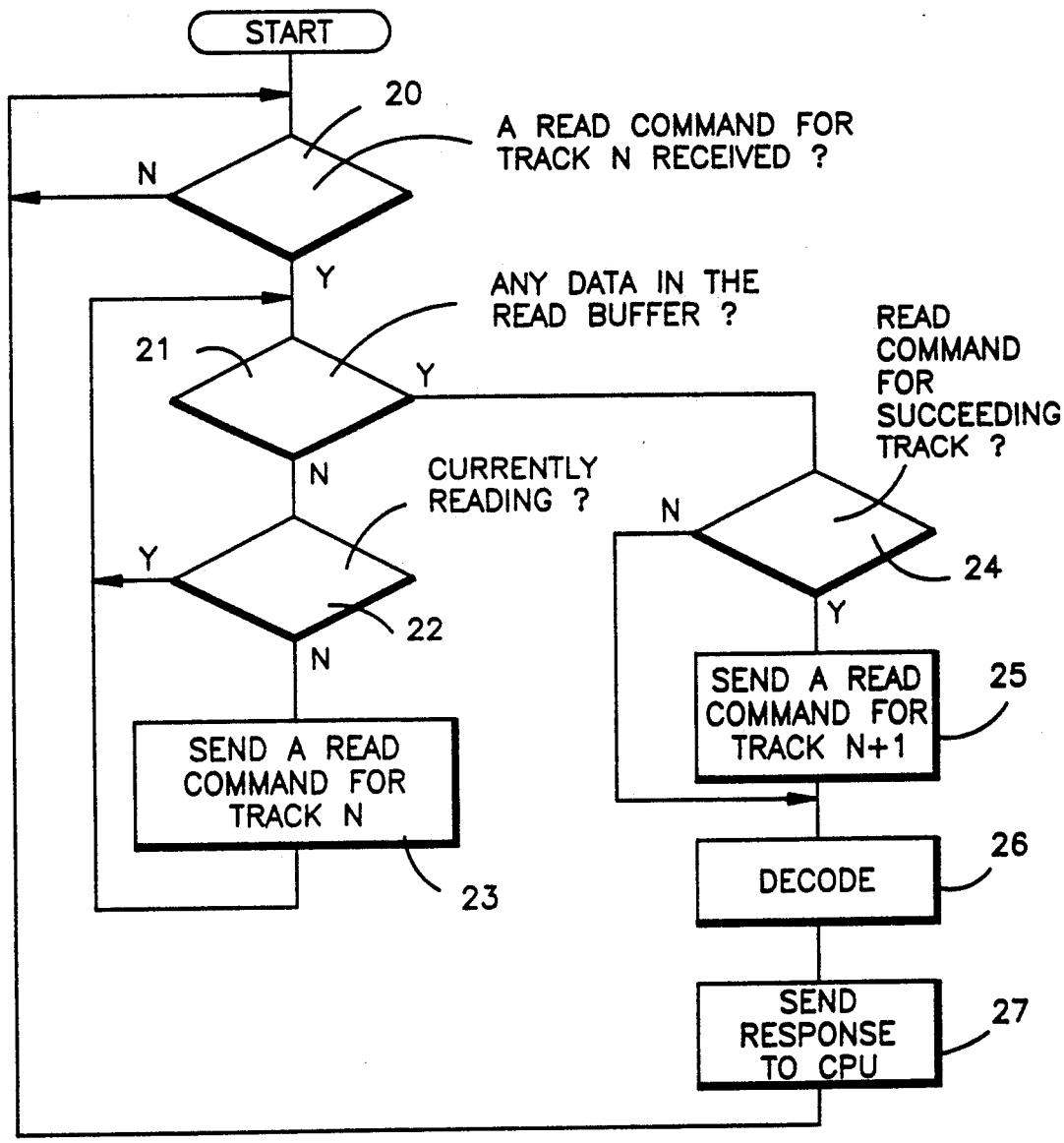
FIG. 5 is a flow chart showing the order of processing performed by the decoder of FIG. 1.
Figure 6:
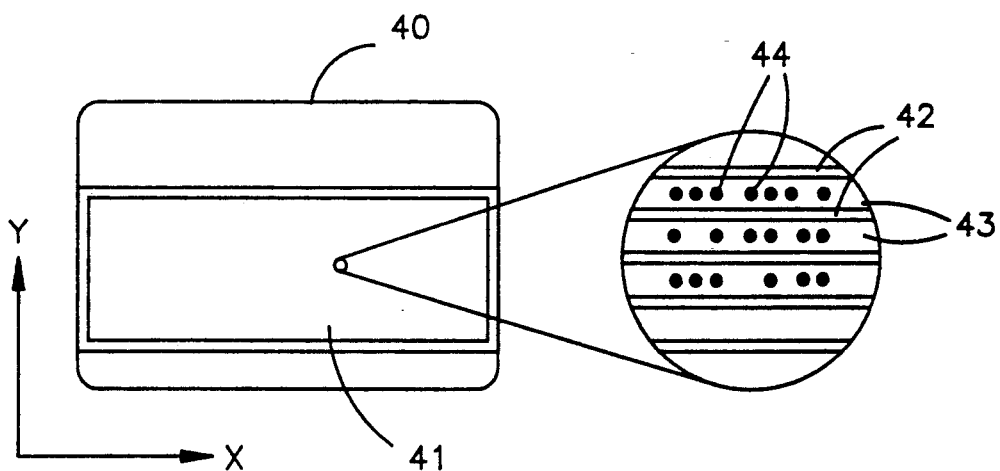
FIG. 6 shows the whole of an optical card as well as a magnified portion of it.
Figure 7:
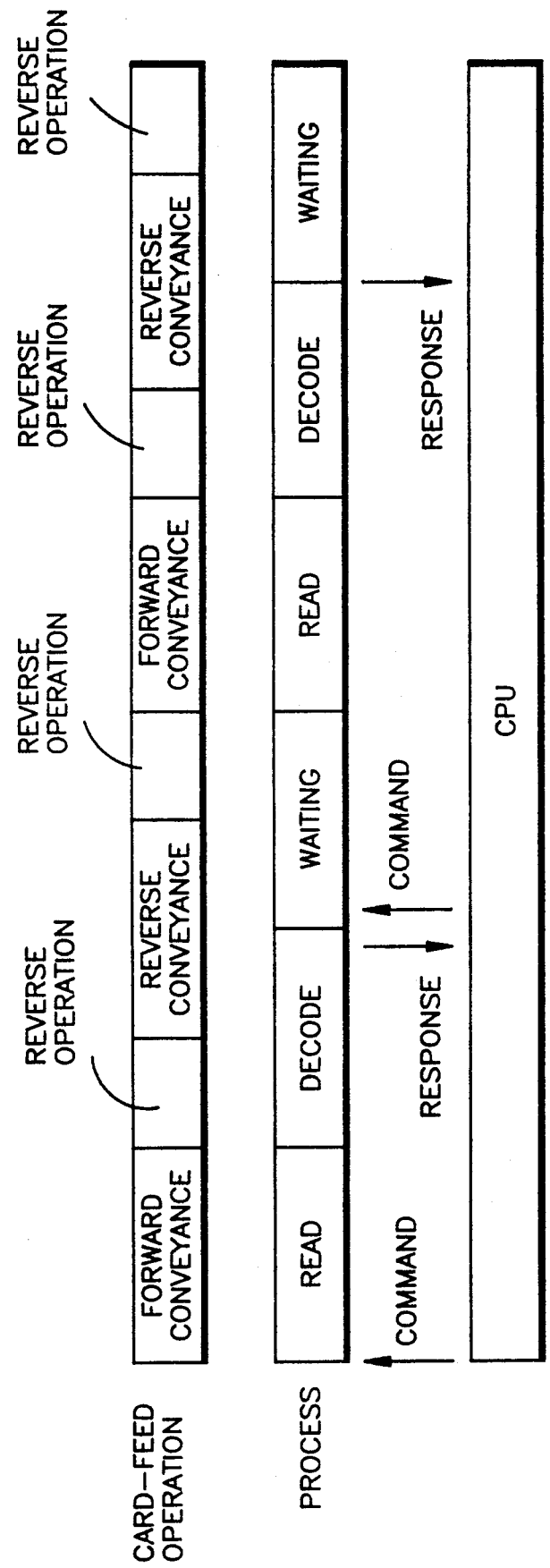
FIG. 7 is a timing diagram explaining the operation of an existing device for recording and reproducing data on an optical card. This diagram shows the timing which exists when the card is conveyed back to its starting point and data is read only while the card is being fed forward.
Figure 8:
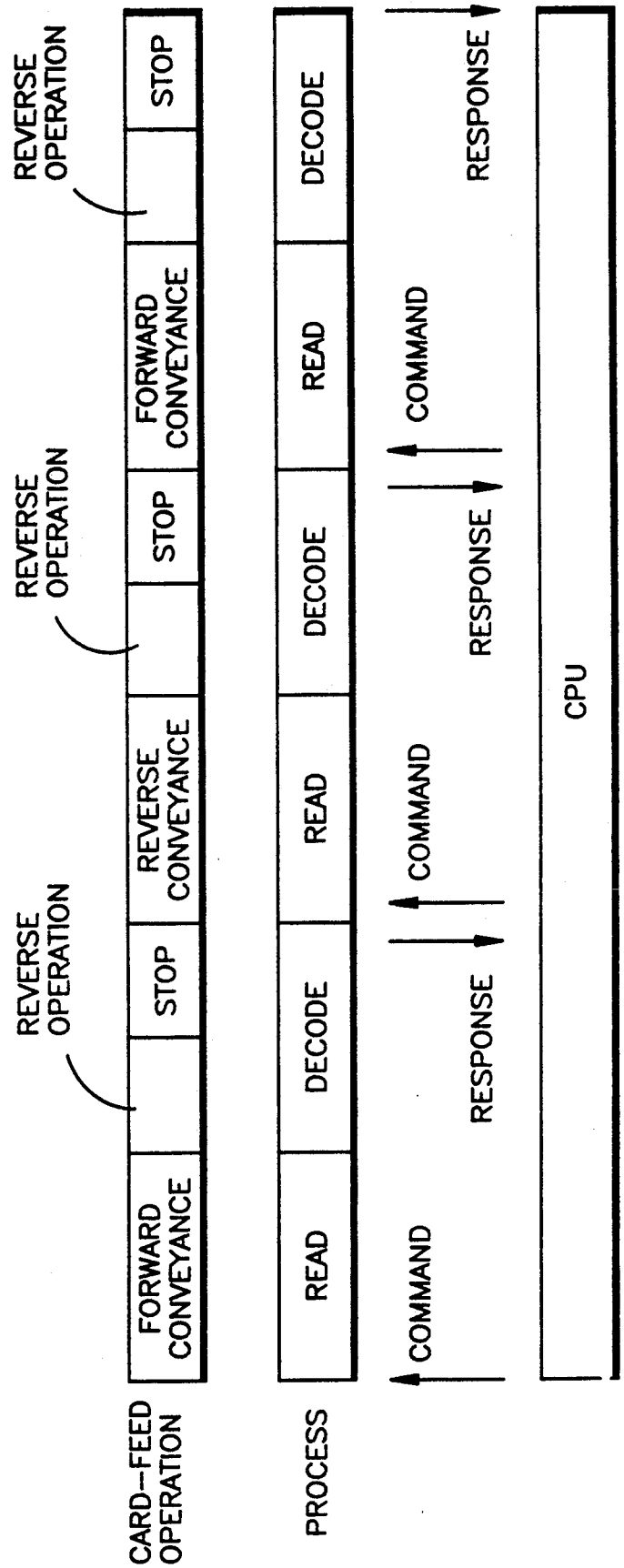
FIG. 8 is a timing diagram explaining the operation of an existing device for recording and reproducing data on an optical card. This diagram shows the timing relationship between the card-feed and the various operations when the card is fed in two directions and the data are read off the card during both forward movement and reverse movement.

FIG. 5 shows the order of processing performed by decoder 7 when it executes the operations shown in FIGS. 2 and 3.

As shown in this diagram, a read command for track N (the number of the track designated by the CPU is N) is received from the CPU. (The answer in Step 20 is "yes.") The decoder checks whether there are any data previously read by reading unit 4 stored in the read buffer in RAM 2 (Step 21). If there are no data stored in the buffer, decoder 7 checks whether reading unit 4 is currently in the process of reading data (Step 22). If reading unit 4 is not reading data, decoder 7 sends it a read command for the data on track N (Step 23). If reading unit 4 is reading data, decoder 7 waits until the data reading has been completed. When reading unit 4 has read all the data, they are stored in read buffer 3.

If a command received from the CPU when data is stored or is being stored in the read buffer in RAM 2 (the answer in Step 21 is "yes") turns out to be a read command for the succeeding track (the answer in Step 24 is "yes"), a read command for track N+1 (the next track) is issued to reading unit 4. When this command is sent, the data in the read buffer will immediately be decoded (Step 26). When the decoding has been completed, the decoded data are transmitted to the CPU (Step 27). A read command will be output by the CPU either immediately after the response or after some time has elapsed. In either case, decoder 7 checks again whether there are any data in the read buffer, and repeats the procedure outlined above. If the command received from the CPU is not a read command for the succeeding track, the processing in Step 25 is skipped.

While embodiments of the invention have been described and illustrated it should be apparent that many modifications may be made without departing from the spirit or scope of the invention. Accordingly, the invention is not limited by the foregoing description, but is only limited by the scope of the appended claims.

What is claimed is:

1. An optical card reader comprising:
   reading means for reading data recorded on a specified track of an optical card;
   memory means for storing data read by said reading means;
   decoding means for decoding read data stored in said memory means; and
   controlling means for initiating read operations from a specified track of said optical card, said controlling means, reading means, memory means and decoding means operating in response to a read command issued by said controlling means to cause said reading means to read data from one track of said optical card while said decoding means decodes previously read data stored in said memory means from another track of said optical card;
   said decoding means including means responsive to a read command for reading a specified track issued by said controlling means; means for determining if any previously read track data need to be decoded; means for determining if said reading means is currently reading data from said optical card if no previously read track data need to be decoded; and, means for sending a reading command for said specified track to said reading means if said reading means is not currently reading data.

2. An optical card reader as in claim 1, wherein said decoder means further comprises means responsive to an indication that previously read data needs to be decoded for determining if said read command from said controlling means is for a track which succeeds in a predetermined sequential order the previously read track, and, if so, for issuing a command to said reading means to read the next in-sequence track.

3. An optical card reader as in claim 2, wherein said decoding means decodes the last read track data and sends the decoded data to said controlling means if said read command from said controlling means is for a track which does not succeed in said predetermined sequential order a last read track.

4. An optical card reader as in claim 2, wherein said decoding means decodes the read data from said next-in-sequence numerical track.

5. A method of operating an optical card reader comprising the steps of:
   issuing a reading command to a card reader identifying a first card track to be read;
   reading said first card track on a optical card with said card reader;
   decoding the data read from said first card track;
   reading a second track on said optical card with said card reader while data previously read from said first track is being decoded;
   storing data read from a track of said card prior to decoding it;
   checking when a read command for a specified track is received whether any data from a previously read track is in storage and, is so, said method further comprising the steps of determining if the issued reading command is for a next succeeding track and, if so, sending a reading command for reading the next succeeding track to the reading unit and then decoding the stored data from the previously read track.

6. A method as in claim 5, wherein if the issued command is not for the next succeeding track said method further comprises decoding the data stored from the previously read track.

7. A method as in claim 6, wherein if not data from a previously read track is in storage, the method further comprises determining if a reading unit is reading any tracks of said card and, if not, issuing a reading command to said reading unit for said specified track.

* * * * *